United States Patent

Koberstein et al.

[15] 3,639,269

[45] Feb. 1, 1972

[54] CATALYST FOR THE OXIDATION OF ALKENES

[72] Inventors: Edgar Koberstein, Alzenau; Theodor Lussling, Gross-Auheim; Ewald Noll, Gross-Krotzenburg; Helmut Suchsland, Gross-Auheim; Wolfgang Weigert, Offenbach, Main, all of Germany

[73] Assignee: Deutsche Gold und Silber Scheideanstalt vormals Roessler, Frankfurt (Main), Germany

[22] Filed: Aug. 25, 1969

[21] Appl. No.: 852,932

[30] Foreign Application Priority Data

Aug. 31, 1968 Germany .................... P 17 92 424.2

[52] U.S. Cl. .................. 252/437, 260/533 N, 260/604 R
[51] Int. Cl. ........................................... B01j 11/82
[58] Field of Search ............. 252/435, 437; 260/533 N, 604

[56] References Cited

UNITED STATES PATENTS

| | | |
|---|---|---|
| 2,704,747 | 3/1955 | Bielawski ..................... 252/437 X |
| 3,192,259 | 6/1965 | Fetterly et al. ................ 252/437 X |
| 3,271,447 | 9/1966 | Naylor ......................... 252/437 X |
| 3,338,952 | 8/1967 | Callahan et al. .............. 260/604 UX |
| 3,454,630 | 7/1969 | Yamaguchi et al. ........... 252/437 X |
| 3,471,556 | 10/1969 | Yamaguchi et al. ........... 252/437 X |
| 3,522,299 | 7/1970 | Takenaka et al. ............. 252/437 X |

*Primary Examiner*—Patrick P. Garvin
*Attorney*—Cushman, Darby & Cushman

[57] ABSTRACT

A catalyst for the oxidation of alkenes to unsaturated aldehydes and carboxylic acids containing Ni, Co, Fe, Bi, P, Mo and O is improved by adding tantalum oxide or samarium oxide. The catalyst can be employed on a carrier.

6 Claims, No Drawings

CATALYST FOR THE OXIDATION OF ALKENES

The invention is concerned with a catalyst for the production of unsaturated aldehydes and carboxylic acids by oxidation of alkenes in the gas phase.

There are numerous known processes for the oxidation of alkenes to the corresponding aldehydes and carboxylic acids which are characterized by various reaction conditions and especially by various catalysts. As the catalysts there are employed essentially the elements which can exist in several oxidation stages, chiefly vanadium, molybdenum, tungsten, iron, cobalt, nickel, copper, phosphorus, arsenic, antimony, bismuth, and selenium. They are put in especially as the oxides, mostly in mixtures or in some cases as compounds with each others and mostly on a carrier substance based on silica or alumina.

Among the numerous known processes and catalysts only a few are of technical importance. These cause high conversion to occur in a short residence time and at the same time show a good selectivity. According to experience, the selectivity is reduced with increasing conversion and therewith the yield of the desired unsaturated aldehydes and carboxylic acids. The proportion of byproducts, such as unsaturated compounds and products of combustion such as carbon monoxide and carbon dioxide, mounts correspondingly.

In German published application No. 1,129,159, a process is described which, for example, provides a catalyst composed of Bi, Mo, and O or Bi, Mo, P and O. Although this process exhibits many advantages over earlier processes, the yields obtained are unsatisfactory. At a conversion of about 50 percent, there is obtained a yield of only about 35 percent.

An improvement is shown in the process described in Belgian Pat. No. 670,510 and U.S. Pat. No. 3,454,630 in which there is used a catalyst of the composition $$Ni_aCo_bFe_cBi_dP_eMo_fO_g \qquad I$$

In this formula I (a) is a number from 0 to 20 (b) is a number from 0 to 15 (a) and (b) together are a number from 2 to 20 (c) is a number from 0.1 to 7 (d) is a number from 0.1 to 4 (e) is a number from 0.1 to 2 (f) is a number of about 12 and (g) is a number of 35 to 85 More favorable conversions and yields are obtained by this process. Tests have shown that the proportion of the products of combustion formed amounts to about 15 percent and therefore is still relatively high.

It has now been found that a better catalyst for the oxidation of alkenes to unsaturated aldehydes and carboxylic can be made from nickel, cobalt, iron, bismuth, phosphorus, molybdenum and oxygen, if desired on a carrier, if it contains in addition tantalum oxide or samarium oxide.

The catalyst can have empirical formula I as set forth above, i.e., $$Ni_aCo_bFe_cBi_dP_eMo_fO_g$$

where (a), (b), (c), (d), (e), (f) and (g) are as defined above together with the samarium oxide or tantalum oxide. As the additive, there is advantageously employed 0.2 to 5.0 percent, preferably 0.5 to 2.0 percent of $Sm_2O_3$ or $Ta_2O_5$ based on the total catalyst.

There can be employed any of the catalysts set forth in Belgium Pat. No. 670,510, including, for example, the following $Ni_{10.5}Fe_1Bi_1P_1Mo_{12}O_{57}$
$Ni_{10}Co_{0.3}Fe_1Bi_1P_{0.2}Mo_{12}O_{53}$
$Ni_{10}Co_{0.3}Fe_1Bi_1P_1Mo_{12}O_{57}$
$Ni_{10}Co_{0.3}Fe_1Bi_1P_{0.5}Mo_{12}O_{56}$
$Ni_{4.5}Co_4Fe_1Bi_1P_1Mo_{12}O_{54}$
$Ni_7Co_{0.5}Fe_2Bi_2P_1Mo_{12}O_{54}$
$Ni_7Co_2Fe_1Bi_1P_1Mo_{12}O_{54}$
$Ni_{10.5}Fe_1Bi_1P_{0.5}Mo_{12}O_{56}$
$Ni_{10.5}Fe_1Bi_1P_{1.5}Mo_{12}O_{58}$
$Ni_{7.5}Fe_2Bi_2P_1Mo_{12}O_{55}$
$Ni_{4.5}Fe_3Bi_3P_{0.8}Mo_{12}O_{53}$
$Ni_{12}Fe_{1.3}Bi_{0.7}P_1Mo_{12}O_{58}$
$Ni_{14}Fe_1Bi_1P_1Mo_{12}O_{60}$
$Ni_{10.5}Fe_{0.5}Bi_{1.5}P_1Mo_{12}O_{57}$
$Co_8Fe_1Bi_1P_1Mo_{12}O_{50}$
$Co_{4.5}Fe_{1.5}Bi_{1.5}P_1Mo_{12}O_{49}$
$Ni_{10}Fe_{0.5}Bi_{1.5}P_1Mo_{12}O_{57}$
$Ni_{10}Co_{0.3}Fe_1Bi_{0.5}Mo_{12}O_{54}$
$Ni_{4.5}Co_4Fe_1Bi_1P_1Mo_{12}O_{52}$
$Ni_7Co_2Fe_1Bi_1P_1Mo_{12}O_{53}$
$Ni_{10}Co_{0.3}Fe_1Bi_1P_1Mo_{12}O_{51}$ The entire disclosure of Belgium Pat. No. 670,510, is hereby incorporated by reference. Thus, the catalysts having the above empirical formula I can be prepared as set forth in the Belgium patent.

The preferred catalyst has the formula $$Ni_{10}Co_{0.3}Fe_1Bi_1P_1Mo_{12}O_{57}$$

Such a catalyst including, however, samarium oxide or tantalum oxide according to the present invention is characterized primarily by a higher selectivity than the same catalyst omitting the samarium oxide or tantalum oxide. Under the same process conditions, there are obtained higher conversion and at the same amount of conversion higher yields of unsaturated aldehydes and carboxylic acids. Especially the amount of combustion products such as carbon monoxide and carbon dioxide is appreciably less.

The catalysts of the invention are used in a suitable manner on carriers such as silicas or other materials used for this purpose, e.g., alumina, silicon carbide, activated carbon, etc.

It has proven advantageous to use as the carrier a lattice layer silicate of the montmorillonite type and to carry out the preparation of the catalyst mass so that the finished mass exhibits a surface area of 1 to 20, especially 2 to 10 m.²/g. Such a catalyst mass has a surprisingly high lifetime and besides is easily producible in always the same quality and with the same properties.

The catalyst mass is suitable, especially in the form of pellets for use in solid beds, preferably, however, in granular form, for use in fluidized beds.

The oxidation of the alkenes to the corresponding aldehydes and carboxylic acids using the catalysts of the invention takes place in the usual manner with oxygen in the presence of water in vapor phase. There is a broad latitude in the choice of reaction conditions. The reaction is chiefly carried out without the use of pressure at temperatures between 320° and 420° C. As indicated in the Belgium Pat. No. 670,510, these conditions can be varied, e.g., temperatures of 250° to 450° C. and pressures of 0.5 to 10 atmospheres absolute can be employed. The oxygen for the oxidation can originate from any source. In general air is employed since it is readily available. The molar range in proportions of alkene to air to water can be in a wide region. As molar proportions of alkene to air there can be used from 1:5 to 1:20, preferably 1:8 to 1:12, as molar proportions of alkene to water 1:1 to 1:25, preferably 1:2 to 1:6. Advantageously there is employed a residence time of 0.5 to 10, preferably 1 to 4, seconds. These conditions as stated can be varied as shown for example in the Belgium patent and are not critical.

Using the catalysts of the invention alkenes with more than two, preferably three or four carbon atoms can be reacted. Thus, there can be used propylene, isobutylene, butene-1, butene-2, amylene, hexene-1, etc. As unsaturated aldehydes and acids, there can be formed acrolein, acrylic acid, methacrolein, methacrylic acid, crotonaldehyde, crotonic acid, etc.

Unless otherwise indicated, all parts and percentages are by weight.

In the following examples, the following terms are used:

$$\text{Conversion} \ \frac{\text{moles of converted alkene}}{\text{moles of alkene added}} \times 100 \quad (\%)$$

$$\text{Yield} \ \frac{\text{moles of unsaturated compounds produced}}{\text{moles of alkene added}} \times 100 \quad (\%)$$

$$\text{Selectivity} \ \frac{\text{moles of unsaturated compounds produced}}{\text{moles of alkene transformed}} \times 100 \quad (\%)$$

Residence time $\frac{\text{bulk volume of the catalyst}}{\text{gas volume put through/time}}$ (seconds)

$\frac{\text{space-time-yield mass of unsaturated compounds produced/time}}{\text{bulk volume of the catalyst}}$ $\left(\frac{g}{l \times h}\right)$ Loss $\frac{\text{Moles combustion products (CO and CO}_2\text{)}}{\text{Moles of alkene added}} \times 100$ (%)

EXAMPLE 1

Finely divided loose stratified montmorillonite was heated for 5 hours at 1,000° C. One-hundred ten grams thereof was treated in succession with stirring with the following solutions:

A. An aqueous solution of 218.1 grams $Ni(NO_3)_2 \cdot 6H_2O$, 6.5 grams of $Co(NO_3)_2 \cdot 6H_2O$ and 30.3 grams of $Fe(NO_3)_3 \cdot 9H_2O$ in 145.0 grams of water.

B. A nitric acid solution containing 2.22 grams of $Sm_2O_3$, 140.0 grams $HNO_3$ and 10.0 grams water.

C. An aqueous solution of 158.5 grams of $(NH_4)_6 MO_7O_{24} \cdot 4H_2O$ and 8.64 grams of 85 percent phosphoric acid and 500.0 grams of water.

D. A nitric acid solution of 36.4 grams $Bi(NO_3)_3 \cdot 5H_2O$, 3.6 grams $HNO_3$ and 27.0 grams of water.

The resulting suspension was brought to dryness at 110° C. and heated for 2 hours at 250° C. The product was cooled, ground and formed into pellets having a diameter of 2 mm. and a length of 10 mm. Finally, it was calcined at 550° C. for 4 hours.

The catalyst produced has the empirical formula $Ni_1Co_{0.3}Fe_1Bi_1P_1Mo_{12}O_{57}$ and also contained 1 percent $Sm_2O_3$. The catalyst mass consisted of 67 percent of catalyst and 33 percent of the silicate carrier. It had a surface area (BET) of 3.8 m.$^2$/g.

Thirty-seven grams of this catalyst mass was poured into a reactor which was heated to 360° C. Then there was continuously introduced a mixture of propylene, air and steam in the molar proportions of 1:10:4.1. The residence time amounted to 1.8 seconds. The reaction gases were cooled and analyzed. The catalyst was unchanged in surface area and activity after 40 hours of service.

| | |
|---|---|
| Conversion | 90.0% |
| Yield of Acrolein | 74.4% |
| Yield of Acrylic Acid | 9.3% |
| Loss (CO and CO$_2$) | 0.6% |
| Selectivity (acrolein and acrylic acid) | 93.1% |
| Space-time yield (acrolein and acrylic acid) | 121 g./l.×h. h. |

EXAMPLE 2

The process was carried out as in example 1 but using 1 percent $Ta_2O_5$ in place of 1 percent $Sm_2O_3$.

For this purpose in the catalyst preparation as solution B there was used a solution of 2.47 grams of $HTaO_4 \cdot H_2O$ in 300.0 grams of 30 percent aqueous hydrogen peroxide solution. The catalyst prepared had a surface area of 6.5 m.$^2$/g.

| | |
|---|---|
| Conversion | 93.8% |
| Yield of acrolein | 65.2% |
| Yield of acrylic acid | 16.5% |
| Loss (CO and CO$_2$) | 7.8% |
| Selectivity (acrolein and acrylic acid) | 87.2% |
| Space-time yield (acrolein and acrylic acid) | 121 g./l.×h. |

EXAMPLE 3

There was used a catalyst mass-produced in accordance with example 1. Its surface area was 5.6 m.$^2$/g. In place of propylene isobutylene was used.

Forty-four grams of catalyst mass were added. The isobutylene-air-steam mixture had the molar proportions of 1:18:22. The residence time amounted to 4 seconds.

| | |
|---|---|
| Transformation | 79.9% |
| Yield of methacrolein | 37.9% |
| Yield of methacrylic acid | 35.0% |
| Loss (CO and CO$_2$) | 1.0% |
| Selectivity (methacrolein and methacrylic acid) | 91.2% |
| Space-time yield (methacrolein and methacrylic acid) | 109 g./l.×h. |

EXAMPLE 4

There was used the same catalyst as in example 1. It was added, however, not as a solid bed but as a fluidized bed. For this purpose from the catalyst mass pretreated by heated to 250° C. the fraction between 0.1 and 0.4 mm. was removed by sieving. The granules removed by sieving were calcined at 550° C. for 4 hours and used as such as the catalyst. It had s surface area of 4.4 m.$^2$/g.

Fifty-three grams of the catalyst were introduced into the reactor as a fluidized bed, the reactor was heated to 360° C. and then there was introduced a propylene-air-steam mixture in the molar proportions of 1:18:10. The residence time amounted to 1.5 seconds.

| | |
|---|---|
| Conversion | 85.4% |
| Yield of acrolein | 58.3% |
| Yield of acrylic acid | 16.3% |
| Loss (CO and CO$_2$) | 9.6% |
| Selectivity acrolein and acrylic acid) | 87.3% |
| Space-time yield (acrolein and acrylic acid) | 89 g./l.×h. |

EXAMPLE 5

The procedure of example 4 was followed, however, for comparison using a catalyst without $Sm_2O_3$. For this purpose in the preparation of the catalyst solution B was omitted.

| | |
|---|---|
| Conversion | 77.4% |
| Yield of acrolein | 48.8% |
| Yield of acrylic acid | 11.8% |
| Loss (CO and CO$_2$) | 15.4% |
| Selectivity (acrolein and acrylic acid) | 78.3% |
| Space-time yield (acrolein and acrylic acid) | 72 g./l.×h. |

What is claimed is:

1. A catalyst suitable for the oxidation of alkenes to unsaturated aldehydes and carboxylic acids consisting of (1) $Ni_aCo_bFe_cBi_dP_eMo_fO_g$ where $a$ is a number from 0 to 20, $b$ is a number from 0 to 15, $a$ and $b$ together are a number from 2 to 20, $c$ is a number from 0.1 to 7, $d$ is a number from 0.1 to 4, $e$ is a number from 0.1 to 2, $f$ is a number of about 12 and $g$ is a number of 35 to 85, together with (2) 0.2 to 5 percent of tantalum oxide or samarium oxide.

2. A catalyst according to claim 1 wherein catalyst (1) has the formula $Ni_{10}Co_{0.3}Fe_1Bi_1P_1Mo_{12}O_{57}$.

3. A catalyst according to claim 1 containing 0.5 percent to 2 percent of the tantalum or samarium oxide.

4. A catalyst according to claim 1 containing samarium oxide.

5. A catalyst according to claim 1 having as a carrier a lattice layer silicate.

6. A catalyst according to claim 1 wherein the catalyst mass has a surface area of 1 to 20 m.$^2$/g.

UNITED STATES PATENT OFFICE
CERTIFICATE OF CORRECTION

Patent No. 3,639,269　　　　　Dated　February 1, 1972

Inventor(s)　Edgar Koberstein et al

It is certified that error appears in the above-identified patent and that said Letters Patent are hereby corrected as shown below:

Col. 3, lines 4-6, "space-time-yield" should be on the same level as the line between "mass of unsaturated" and "bulk volume of the catalyst".

Col. 3, line 57, "$HtaO_4$" should be --$HTaO_4$--.

Col. 4, line 22, at the end of the line, "s" should be --a--.

Claim 1, col. 4, line 53, "$Ni_aCo_bFebcBi_dP_eMo_fO_g$"

should read --$Ni_aCo_bFe_cBi_dP_eMo_fO_g$--.

Signed and sealed this 26th day of September 1972.

(SEAL)
Attest:

EDWARD M. FLETCHER, JR.　　　　　ROBERT GOTTSCHALK
Attesting Officer　　　　　　　　　Commissioner of Patents